(12) United States Patent
Xu

(10) Patent No.: US 8,443,004 B2
(45) Date of Patent: May 14, 2013

(54) SYSTEM AND METHOD FOR STORING AND COMPUTING BUSINESS DATA AND LOGIC

(76) Inventor: Kevin Houzhi Xu, Bridgewater, NJ (US)

( * ) Notice: Subject to any disclaimer, the term of this patent is extended or adjusted under 35 U.S.C. 154(b) by 0 days.

(21) Appl. No.: 13/076,382

(22) Filed: Mar. 30, 2011

(65) Prior Publication Data

US 2012/0254248 A1    Oct. 4, 2012

(51) Int. Cl.
  *G06F 17/30* (2006.01)
(52) U.S. Cl.
  USPC ............ 707/796; 707/790; 715/700; 716/50; 717/100; 717/168; 717/174
(58) Field of Classification Search .................. None
  See application file for complete search history.

(56) References Cited

U.S. PATENT DOCUMENTS

| | | | | |
|---|---|---|---|---|
| 5,995,958 | A * | 11/1999 | Xu | 1/1 |
| 6,643,638 | B1 * | 11/2003 | Xu | 1/1 |
| 8,010,569 | B2 * | 8/2011 | Mazzagatti | 707/791 |
| 2004/0193590 | A1 * | 9/2004 | Mizunuma et al. | 707/3 |
| 2006/0101048 | A1 * | 5/2006 | Mazzagatti et al. | 707/101 |
| 2006/0248455 | A1 * | 11/2006 | Weise et al. | 715/526 |
| 2007/0094174 | A1 * | 4/2007 | Hamadi et al. | 706/19 |
| 2007/0219975 | A1 * | 9/2007 | Mazzagatti | 707/4 |
| 2007/0220070 | A1 * | 9/2007 | Mazzagatti | 707/204 |
| 2010/0036835 | A1 * | 2/2010 | Stergiou et al. | 707/5 |
| 2010/0169372 | A1 * | 7/2010 | Mazzagatti | 707/774 |
| 2010/0281063 | A1 * | 11/2010 | Ushiyama | 707/797 |

* cited by examiner

*Primary Examiner* — Hung Le

(57) ABSTRACT

A computer system and method is to manage business data and logic in a uniformed manner. It is based on the theory of total recursive functions. As a result, it is a monolith consolidating the multiple-component architecture of traditional technologies in the fields of programming language and database management. Secondly, the properties of the theory of total recursive functions are uniquely demonstrated by a set of built-in operators of the system. Therefore, it offers novel approaches to many challenges in the fields of artificial intelligence and knowledge management facing the traditional technologies.

4 Claims, 5 Drawing Sheets

---

Given a database, a db-term is evaluated with the following reduction rules:
(1). If a db-term is a constant, the db-term is returned as its value.
(2). If a db-term is a non-leaf db-term, the db-term itself is returned as its value.
(3). Given an assignment in a database, the value of the assignee is the value of the assigner.
(4). Given a db-term (M N), M and N are evaluated first with the return values M' and N'. If (M' N') is a db-term in the database, the value of (M N) is (M' N'). Otherwise, the value of (M N) is Undefined.

When a db-term M can be reduced to another db-term N by a finite number of reduction steps, M is said to be equal to N (or denoted as M == N); or M and N are convertible.

---

Given a combination (M N), M is called a sub-term of (M N), so is N.

Given a db-term M, M itself is called a sub-term of M.

Given a db-term M and one of its sub-term S, if S' is a sub-term of S, then S' is a sub-term of M as well.

The built-in operator {= takes two db-terms M and N as its parameters. If M is a sub-term of N, then N {= M is defined to be True.

The Built-in operator (= takes two db-terms M and N as its parameters. If N is a sub-term of M, and there is another db-term Q such that M == Q, then Q (= N is defined to be True.

The query "Is Salsa an ingredient of the dish "spicy parmesan chicken?" is expressed in Froglingo as:
spicy parmesan chicken (= Salsa;

Sample db-terms:

Labels: "a string", 12.4, college.edu, Salsa.

Combinations: College Admin (SDD John) Major, sauce Salsa.

Boolean operations: SSD.gov John birth > '6/1/1980', spicy parmesan chicken (= Salsa.

Assignments: SSD.gov John birth := '2/2/1999'.

```
The database in ep-terms, an alternative presentation of Fig. 6:
SSD.gov John SSN := 123456789;
SSD.gov John birth := '6/1/1990';
college.edu admin (SSD.gov John) enroll := '9/1/2008';
college.edu admin (SSD.gov John) Major := college.edu CS;
college.edu CS CS100 (college.edu admin (SSD.gov John))
grade := "F";
```

Fig. 8

```
The database in db-terms, an alternative presentation of Fig. 1:
(flour (all purpose)) sugar yeast salt milk egg bake
        := world class waffle;
(flour (all purpose)) sugar yeast salt shortening bake
        := batter white bread;
(meat chicken) cheese seasoning (sauce salsa) bake Italian
        := spicy parmesan chicken;
```

Given a database, a db-term is evaluated with the following reduction rules:
(1). If a db-term is a constant, the db-term is returned as its value.
(2). If a db-term is a non-leaf db-term, the db-term itself is returned as its value.
(3). Given an assignment in a database, the value of the assignee is the value of the assigner.
(4). Given a db-term (M N), M and N are evaluated first with the return values M' and N'. If (M' N') is a db-term in the database, the value of (M N) is (M' N'). Otherwise, the value of (M N) is Undefined.

When a db-term M can be reduced to another db-term N by a finite number of reduction steps, M is said to be equal to N (or denoted as M == N); or M and N are convertible.

Fig. 10

Given a combination (M N), M is called a sub-term of (M N), so is N.

Given a db-term M, M itself is called a sub-term of M.

Given a db-term M and one of its sub-term S, if S' is a sub-term of S, then S' is a sub-term of M as well.

The built-in operator {= takes two db-terms M and N as its parameters. If M is a sub-term of N, then N {= M is defined to be True.

The Built-in operator (= takes two db-terms M and N as its parameters. If N is a sub-term of M, and there is another db-term Q such that M == Q, then Q (= N is defined to be True.

SYSTEM AND METHOD FOR STORING AND COMPUTING BUSINESS DATA AND LOGIC

BACKGROUND OF THE INVENTION

1. Field of the Invention

This invention is related to the fields of programming languages and database management systems for arbitrary computing applications including database applications, artificial intelligent applications, knowledge-based reasoning applications, and web-based applications.

2. Description of the Prior Art

Many database applications were written in programming languages in the 1960s and 1970s, and are still in operation. The use of database management system (DBMS) came to database application software in and around the 1970s. It significantly improves the productivity in software development and maintenance. The data models, i.e., the mathematical roots of DBMSs, square off programming languages by three essential characteristics: 1) a data model offers set-oriented operations to update and query data, 2) a program always terminates at arbitrary input, i.e. computer stops, and 3) a data model is declarative, i.e., it allows programmers to specify what a program is in terms of business requirements, but don't necessarily specify how it will be implemented.

The traditional data models, i.e., the relational data model and the hierarchical data model, cannot express all desired business data. Hierarchical data, for example, can be folded into a relation, but its containment relationships cannot be captured by the relational data model with the expressive power of the relational algebra (Reference: A. V. Aho and J. D. Ullman, "Universality of Data Retrieval Languages", Conference Record of the Sixth Annual ACM Symposium on Principles of Programming Languages, San Antonio, Taxes, January, 1979, page 110-120). Another example would be relationships among the vertices in a directed graph, (e.g., is there a path from A to B?), which cannot be captured in both the relational data model and the hierarchical data model. As a result, database applications continuously require intense, though relieved, development and maintenance work, which could be avoided if a more expressive data model were realized and leveraged.

The EP (Enterprise-Participant) data model is semantically equivalent to a class of total recursive functions (Reference: K. H. Xu, J. Zhang, S. Gao, R. R. McKeown, "Let a Data Model be a Class of Total Recursive Functions", the International Conference on Theoretical and Mathematical Foundations of Computer Science—TMFCS, 2010, page 15-22). The equivalence says that programmers are not allowed to construct an application program that may not terminate on an input. At the same time, it says mathematically that any meaningful application programs, i.e., those with the semantics falling into the class of total recursive functions, can be expressed in the EP data model.

The EP data model is a data model because it possesses the three above-mentioned essential characteristics. To demonstrate the significance of the EP data model being both a data model and the first language semantically equivalent to a class of total recursive functions, an objective view was suggested on easiness (References: K. H. Xu, J. Zhang, S. Gao, "Assessing Easiness with Froglingo", the Second International Conference on the Application of Digital Information and Web Technologies, 2009, page 847-849, and K. H. Xu, J. Zhang, S. Gao, "An Assessment on the Easiness of Computer Languages", the Journal of Information Technology Review, May, 2010, page 67-71). This view contends that: 1) a data model is easier to use than a programming language in the development and maintenance of those applications expressible in the data model, 2) if one data model is more expressive than another data model, the former is easier than the latter in the development and maintenance of the applications where a programming language is involved, and 3) a programming language, by incorporating with a total-recursive-equivalent data model, is the easiest to use in software development and maintenance. Froglingo, a programming language comprising the EP (Enterprise Participant) data model, was therefore concluded to be the easiest programming language.

Calling Froglingo the easiest programming language to use implies that Froglingo is a monolith that consolidates the multiple software components of traditional software architecture (Reference: K. H. Xu, J. Zhang, S. Gao, "Froglingo, A Monolithic Alternative to DBMS, Programming Language, Web Server, and File System", the Fifth International Conference on Evaluation of Novel Approaches to Software Engineering, 2010). Secondly, it implies that Froglingo is a novel approach to many challenges facing traditional technologies in the fields of artificial intelligence and knowledge management (Reference: K. H. Xu, J. Zhang, S. Gao, "Approximating Knowledge of Cooking in Higher-order Functions, a Case Study of Froglingo", the Workshop Proceedings of the Eighteenth International Conference on Case-Based Reasoning—ICCBR, 2010, page 219-228).

The U.S. Pat. No. 5,995,958 "System and Method for Storing and Managing Functions" issued to Kevin H. Xu and in the U.S. Pat. No. 6,643,638 "System and Method for Storing and Computing Data and Functions" have already been granted for the inventions related to the technologies in Froglingo. However, there are some new developments from the latest research. This patent application is filed to cover the new inventions out of the development.

SUMMARY OF THE INVENTION

This invention is related to the previous ones in U.S. Pat. Nos. 6,643,638 and 5,995,958. Specifically the invention has been refined with less core components, and two new built-in operators have been introduced. They were developed through a knowledge management project (Reference: K. H. Xu, J. Zhang, S. Gao, "Approximating Knowledge of Cooking in Higher-order Functions, a Case Study of Froglingo", the Workshop Proceedings of the Eighteenth International Conference on Case-Based Reasoning—ICCBR, 2010, page 219-228). They are anticipated to be useful in knowledge management and artificial intelligence.

BRIEF DESCRIPTION OF THE DRAWINGS

FIG. 7 shows the Froglingo expressions equivalent to the database in FIG. 6. Note that the logical view in FIG. 6 is presented syntactically in the Froglingo expressions.

FIG. 8 shows the Froglingo expressions equivalent to the database in FIG. 1. Similar to FIG. 6 and FIG. 7, FIG. 1 gives a logical view of the database in a diagram while FIG. 8 gives the syntactical presentation of the database.

FIG. 9 shows the Froglingo computing rules.

FIG. 10 shows the computing methods of the two newly invented built-in operators.

DETAILED DESCRIPTION OF THE INVENTION

System Architecture

A preferred embodiment of the invention is Data Server 10 which comprises Receptionist 30, Database and Process 50, and Speaker 100.

Receptionist 30 is a unit that receives requests from users or other computing systems through Channel 20. Receptionist 30 knows the formats of the requests; and converts the requests into the format acceptable by the Database and Process 50. It knows the identities of the senders and informs Speaker 100 the identities.

Figures 1, 2:
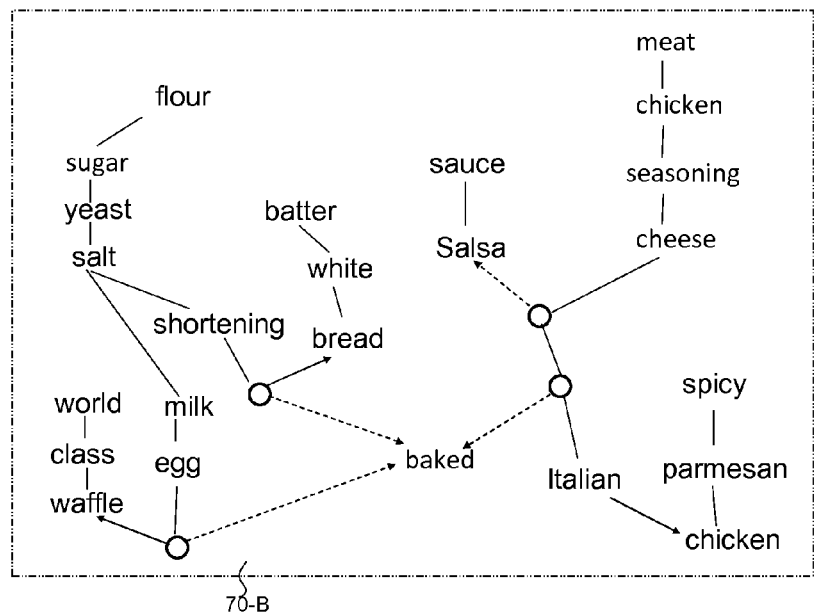
FIG. 1 shows a sample knowledge representation in Froglingo, where arbitrary data is modeled uniformly without a necessity of user-defined data types.
FIG. 2 shows a sample query in Froglingo that utilizes one of the newly invented built-in operators.
Figure 3:
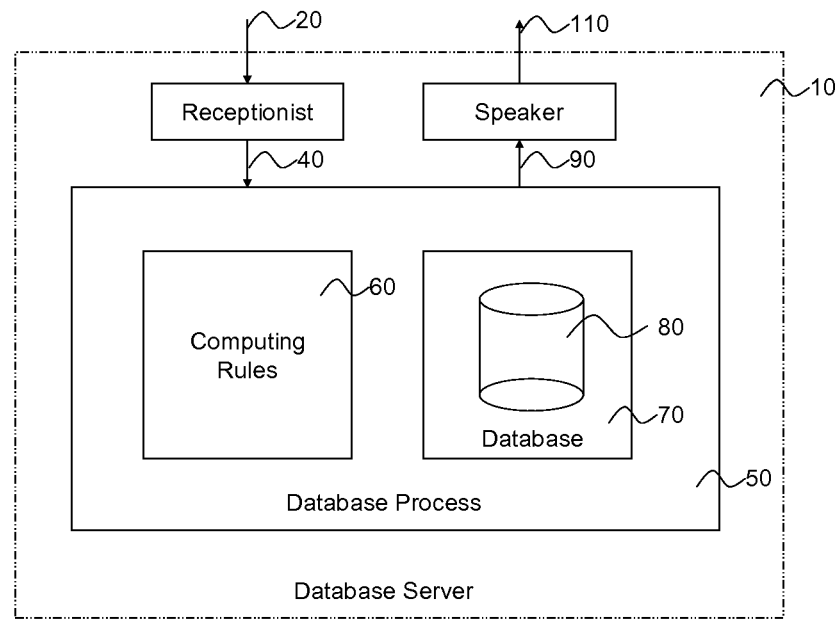
FIG. 3 shows the system architecture of a Froglingo system.

Speaker 100 in FIG. 1 takes db-terms from channel 90 and responds clients with the outputs 110 converted from the db-terms in the formats the clients need.

There are two primary sub units in Data Process 50. One is Database 70 storing and presenting a set of fixed functions and dynamic data. The second sub unit is Computing Rules 60 which converts db-terms from Channel 40 to their outputs 90 according to the db-terms and the states of Database 70.

Labels

As a preferred embodiment of the invention, a label is a sequence of alpha-numerical characters excluding special characters such as the space ' ', the tab '\t', and the return key '\n'. The labels comprise the following two types:

(1) Constants. Like in other programming languages, integers such as 3, real numbers such as 3.14, and strings such as "a string" are constants. The labels Undefined, True, and False are special constants. Froglingo has a set of built-in operators as constants comprising {= and (=.

(2). Identifiers. An identifier is a sequence of alpha-numeric characters that is not a constant. Here are a few examples: Salsa, Italian, college.edu in FIG. 1, FIG. 5 and FIG. 6.

Three Link Types

Figures 5, 6:
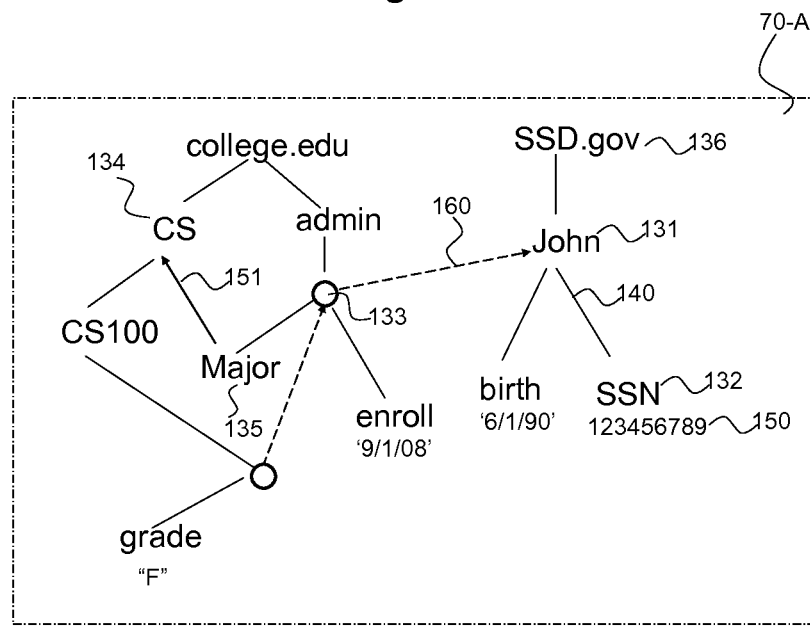
FIG. 5 gives a few examples of valid db-terms.
FIG. 6 shows a graphical presentation of a Froglingo database for a school administration. Note that the graphical presentation is not in the syntax of Froglingo, but to demonstrate the physical implementation of the data structure embedded in Froglingo, and a logical view for database design.

Database 70 is a system with permanent storage 80 which exhibits both the fixed functions and the dynamic data in a uniformed data structure. As a preferred embodiment of the invention, the data structure is a finite set of nodes connected by the three types of connections (or links): up-down links, solid arrows, and dash arrows. FIG. 1 and FIG. 6 give some examples of this data structure.

The first type of links are up-down links, physical references (such as one-way pointers or two-way pointers), each of which connects two nodes together at its two ends as a preferred embodiment of the invention. A link is called the upper link of a node if the link is above the node and is connected with the node; and a link is called the lower link of a node if the link is below the node and connected with the node. A node at the down side of a link is called the down-side node of the link; and a node at the up-side of a link is called the up-side node of the link. Given the node at one side of a link, the node at the other side can be located through the link. For example, all the links with the orientation of up and down in FIG. 1 and FIG. 6 including the link 140 are up-down links. Given the link 140, the node 131 is the up-side node of the link 140; the node 132 is the down-side node of the link 140.

The second type of links are dash arrows, physical references (such as one-way pointers or two-way pointers), each of which connects two nodes together at its two ends as a preferred embodiment of the invention. The node at the tail of a dash arrow is called the tail node of the dash arrow; and the node at the head of the arrow is called the head node of the dash arrow. Given the node at one end of an arrow, the node at the other end can be located through the arrow. For example, all the arrows in dash line in FIG. 1 and FIG. 6 including the arrow 160 are dash arrows The third type of links are solid arrows, physical references (such as one-way pointers or two-way pointers) that connects two nodes together at its two ends as a preferred embodiment of the invention. The node at the tail of a solid arrow is called the tail node of the solid arrow; and the node at the head of the arrow is called the head node of the solid arrow. Given the node at one end of an arrow, the node at the other end can be located through the arrow. For example, all the solid arrows including the arrow 151 are solid arrows.

Nodes and Database Constraints

A node represents a dividable data or function. It is an end of a link, either an up-down link, a solid arrow link, or a dash arrow link. (The nodes in FIG. 1 and FIG. 6 are represented either as circles such as Circle 133, or an identifier with or without a tag such as Node 131 without a tag and Node 132 with Tag 150) A node imposes the following constraints on the connected links:

(1). Each end of a link is a node.

(2). A node must not have more than one upper link of the first link type. If there is no upper link, the node is called a root. For example, the labels flour in FIG. 1 and college.edu in FIG. 6 are roots. Given an up-down link, the up-side node is called the superior of the down-side node; and the down-side node is called a subordinate of the up-side node. For example, Node 132 is a subordinate of Node 131; and Node 131 is the superior of the Node 132.

(3). A node must not have more than one dash arrow of the second like type pointing away from it. Given a dash arrow, the head node is called the parent of the tail node; and the tail node is called a child of the parent. For example, Node 133 is a child of Node 131; and Node 131 is the parent of Node 133.

(4). A node may have zero or more than one subordinate(s). If there is no subordinate, a node may have a tag. A node that has a tag is called a leaf node. For example, Nodes 132 is a leaf node having the tag value 123456789 (called Tag 150 in the invention specification).

(5). A node may have a label. For example, the labels of Nodes 131 and 132 are John and SSN respectively. A root shall always have a label. A non-root node without label must have a dash arrow pointing away from it. For example, the Node 131 has the label John. Node 133 has the dash arrow 160 pointing away from it.

(6). Starting from a node, one would never travel back to the same node by taking the links belonging to one of the three link types. Further, the nodes and the links with a single type of the connections (or links) in Database 70 form a structure of trees. For example, all the nodes and the up-down links in FIG. 1 and FIG. 6 form trees; all the nodes and the dash arrows in FIG. 1 and FIG. 6 form directed trees; and all the nodes and the solid arrows in FIG. 1 and FIG. 6 form directed trees.

(7). Two subordinates under a single superior shall not be convertible, i.e., semantically equal, as more discussion will be done about it late in this invention description.

Tags

A leaf node may have another db-term with a lesser font size spelled out under its label, or a solid arrow pointing away from it. In other words, a leaf node can be assigned with a tag in one of the two following forms:

(1). When the given node has a solid array pointing away from it, its tag is the node connected by the head of the solid arrow. For example Node 135 has Node 134 as its tag because the solid arrow 150 is between the two nodes.

(2). When the given node doesn't have a solid arrow pointing away from it, its tag is spelled with a lesser font size right below the label of the node in FIG. 1 and FIG. 6. For example, Node 132 has the integer 123456789 as the tag.

As a matter of fact, the tag of a leaf node represents the assignment relationship between the leaf node as the assignee and the tag as the assigner. Therefore, the two forms described above are just two alternative ways of describing assignments.

db-Terms

Figure 4:
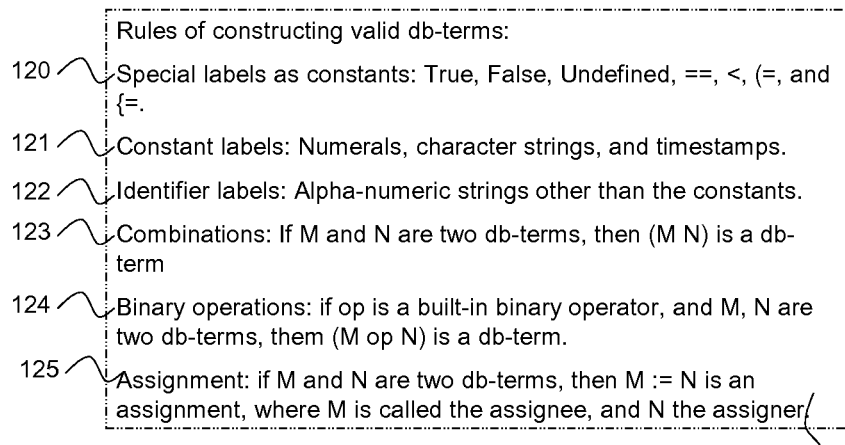
FIG. 4 shows the rules of forming valid db-terms—input expressions.

The scanner of Receptionist 30 may accept requests (input expressions) in different formats through Channel 20. But the parser of Receptionist 30 converts all the formats into the uniformed one as a preferred embodiment of this invention. This format, called db-terms, is defined in FIG. 4. Rule 120, Rule 121, and Rule 122 in FIG. 4 say that any label is a db-term. The examples are such as college.edu, 12.4, and "a string" in FIG. 5. Rule 123 says that a combination of two db-terms is also a db-term. The parentheses in db-terms are the delimiters for grouping sub db-terms, and they don't have to be written if there is no ambiguity. The examples are (college.edu CS), (college.edu CS CS101 (college.edu Admin (SSD John))), (123 College), and (any garbage). Rule 124 says that a binary operation (M op N) with a built-in binary operator op is a db-term. The examples are SSD.gov John birth>'6/1/1980', and spicy parmesan chicken (=Salsa in FIG. 5. Rule 125 says that an assignment M:=N is a db-term, where M is the assignee and N the assigner. A example is SSD.gov John birth:='6/1/1999' in FIG. 6. FIG. 7 and FIG. 8 give the db-terms representing the data depicted in the diagrams of FIG. 1 and FIG. 6.

Node Names

Each node in Database 70 has a distinguished name. Given a node in Database 70, its name is formed in the following methods:

(1). If a node is a root, its name is the label of the node itself. For example, the name of Node 136 is SSD.gov.

(2). If a non-root node has a label L and its superior's name is S, then the name of the non-root node is the db-term (S L). For example, Node 131 has the name SSD.gov John.

(3) If a node has a parent named as P and its superior's name is S, then the name of the non-root node is the db-term (S P). For example, Node 133 in FIG. 5 has the name (college.edu admin (SSD.gov John)).

(4) If a node with named N has a tag named as T, then the relationship between N and T is represented as an assignment where the N is the assignee and T is the assigner. For example, FIG. 4 displays the assignments: SSD.gov John birth:='6/1/90', college.edu admin (SSD.gov John) enroll:='9/1/08', and college.edu admin (SSD.gov John) Major:=college.edu CS.

Values of db-Terms

For each db-term from Channel 40, Database and Process 50 will reference Database 70, and compute the value of the db-term. The computation (or called reduction) process from a db-term to its value is another preferred embodiment of this invention. The value of a db-term is a normal form.

Given a database, a normal form is one of the followings.
(1). A constant is a normal form.
(2). The name of a non-leaf node is a normal form.

Given a database, the Database Process 50 has the following reduction rules:

(1). If a db-term is a constant, the db-term is returned as its value.
(2). If a db-term is a non-leaf db-term, the db-term itself is returned as its value.
(3). If a db-term has a tag, the value of the given db-term is the value of its tag.
(4). Given a db-term (M N), M and N are evaluated first with the return values M' and N'. If (M' N') is a db-term in the database, the value of (M N) is (M' N'). Otherwise, the value of (M N) is Undefined.
(5). Applying a constant to an arbitrary db-term returns Undefined. For example, True college.edu=Undefined, 12.3 John=Undefined.

When a db-term M can be reduced to another db-term N by a finite number of reduction steps, M is said to be equal to N (or denoted as M=N); or M and N are convertible. With FIG. 6 as a database, there are following equations:

SSD.gov John birth='6/1/90';
College.edu admin (SSD.gov John) Major CS100=college.edu CS CS100.

Built-in Operators (1). The built-in operator {=, called "has-a-sub-term", takes two db-terms M and N as its parameters. If M is a sub-term of N, then N {=M is defined to be True. For example, the expressions: SSD.gov John {=John is evaluated to be True with the database in FIG. 6. The expression: meat chicken seasoning cheese (sauce Salsa) baked Italian {=sauce Salsa is evaluated to be True.

The "has-a-sub-term" operator does not depend on the link type of solid arrows. Therefore, the link type of solid arrows, a core component of the invention in U.S. Pat. No. 6,643,638, is no longer a core component of the current invention.

(2). The Built-in operator (=, called "has-a-derivable-sub-term", takes two db-terms M and N as its parameters. If N is a sub-term of M, and there is another db-term Q such that M=Q, then Q (=N is defined to be True. For example, the expression: college.edu CS (=John is evaluated to be true in FIG. 6. The expression: spicy parmesan chicken (=Salsa is evaluated to be true in FIG. 1.

CONCLUSION

Accordingly, readers see that two new built-in operators are available when business data is organized in the EP data model. The two built-in operators, along with other built-in operators covered under the U.S. Pat. Nos. 6,643,638 and 5,995,958, are anticipated to be very useful in the field of artificial intelligence and knowledge management. A previous experiment has demonstrated it (Reference: K. H. Xu, J. Zhang, S. Gao, "Approximating Knowledge of Cooking in Higher-order Functions, a Case Study of Froglingo", the Workshop Proceedings of the Eighteenth International Conference on Case-Based Reasoning—ICCBR, 2010, page 219-228). Since the EP data model is semantically equivalent to a class of total recursive functions—the complete semantics for arbitrary and meaningful software applications, the built-in operators are uniquely available to Froglingo and universally applicable to arbitrary business software applications.

To effectively protect one of the two built-in operators, one core element in the U.S. Pat. No. 6,643,638 is eliminated from the current invention.

Although the description above contains many specifications, these should not be constrained as limiting the scope of the invention but as merely providing illustrations of some of the presently preferred embodiments of this invention. Thus the scope of the invention should be determined by the appended claims and their legal equivalents, rather than by the examples given.

I claim:

1. An apparatus having input/output means, memory means, and CPU means, comprises a database and a computing processor, said database comprising with a plurality of nodes, a plurality of up-down links, and a plurality of dash arrows, each of said up-down links being a means supported by said memory that has an up end connecting a node selected from said nodes and a down end connecting another node selected from said nodes, each of said dash arrows being a means supported by said memory that has a tail connecting a node selected from said nodes and a head connecting another node selected from said nodes, each of said nodes being connected by the up ends of zero or more links selected from said up-down links and being connected by the heads of zero or more arrows selected from said dash arrows, each of the nodes being connected by the down end of at most one up-down link and being connected by the tail of at most one dash arrow, and each of the nodes which don't have tails having an identifier said computing processor having a plurality of rules selected from a group comprising:
   (a). if the db-term is a constant, said computing processor doesn't converts;
   (b). if the db-term is the name of a non-leaf node selected from said nodes, said computing processor doesn't converts;
   (c). if the db-term is the name of a leaf node connected by the tail of a
   solid arrow, said computing processor converts the db-term to the name of the node connected by the head of said solid arrow, if the db-term is the name of a leaf node having a tag referencing a db-term, said computing processor converts the db-term to said referenced db-term, and if the db-term is the name of a leaf node not having a tag, said computing processor doesn't converts;
   (d). if the db-term is a label not appeared in said database, said computing processor converts the db-term to Undefined;
   (e). if the db-term is a combination of a second db-term and a third db-term, if the second db-term is the name of a node selected from said database, and if said node has a subordinate whose parent has the name of a fourth db-term such that the third db-term and the fourth db-term can be converted to the same fifth db-term, then said computing processor converts the first db-term to the combination of the second db-term and the fourth db-term;
   (f). if the db-term is a combination of a second db-term and a third db-term, if the second db-term is the name of a node selected from said database, if said node doesn't have a subordinate such that the name of the parent of said subordinate and the third db-term are convertible, then said computing processor converts the first db-term to Undefined.

2. The apparatus of claim 1 wherein said database further comprises a boolean operator 'has-a-sub-term' that takes two db-terms as parameters; and return True if one of said db-terms is a sub-term of the other one.

3. The apparatus of claim 1 wherein said database has a plurality of solid arrows being a means supported by said memory, each of said solid arrows having the tail connecting a leaf node selected from said nodes and a head connecting another node selected from said nodes, said tail being the only tail of the kind of solid arrows that said leaf node connects with.

4. The apparatus of claim 1 wherein said database further comprises a Boolean operator 'has-a-derivable-sub-term' that takes two db-terms as parameters, and return True if one of said two db-terms is convertible with a third db-term which is the name of a node selected from said database and if the second of said two db-terms is a sub-term of said third db-term.

* * * * *